Feb. 5, 1935.  J. V. CAPUTO  1,990,370
WELDING APPARATUS
Filed Nov. 14, 1929  5 Sheets-Sheet 1

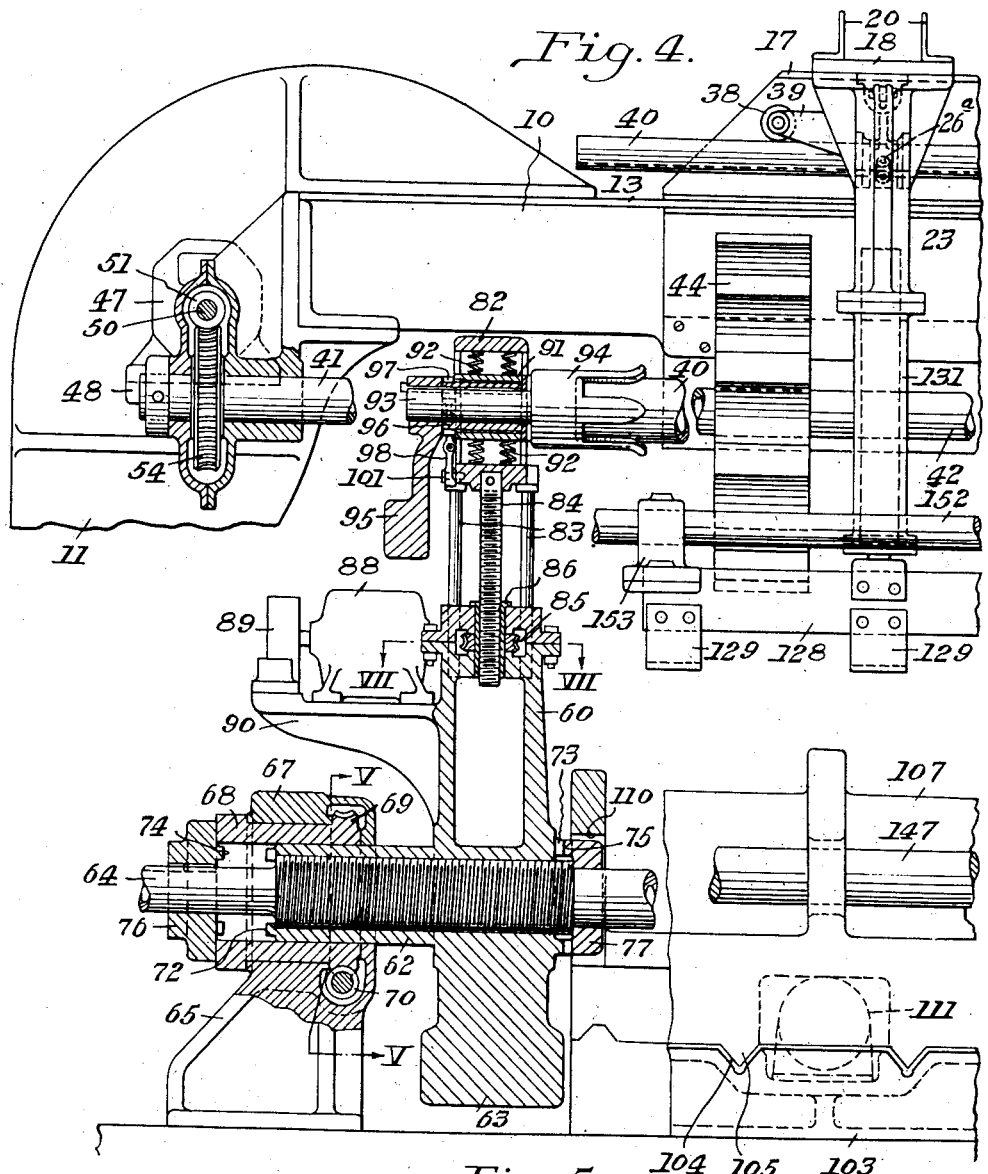
Fig. 4.
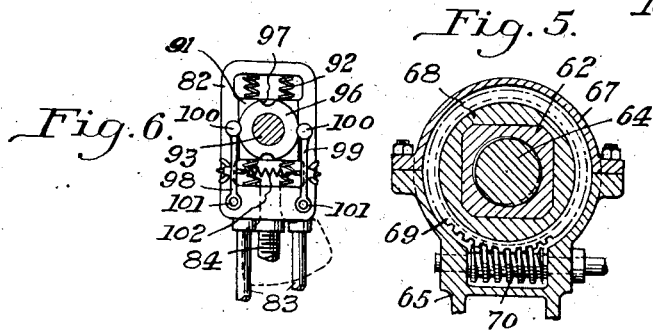
Fig. 5.
Fig. 6.

Feb. 5, 1935.  J. V. CAPUTO  1,990,370
WELDING APPARATUS
Filed Nov. 14, 1929   5 Sheets-Sheet 5
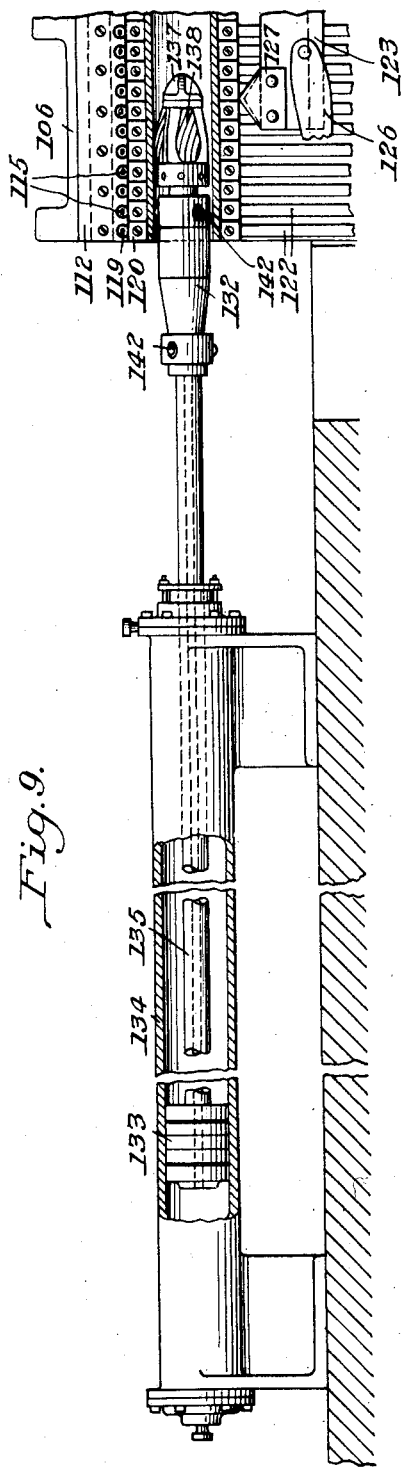
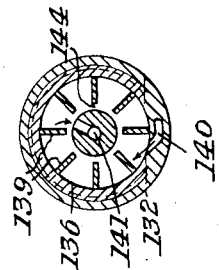
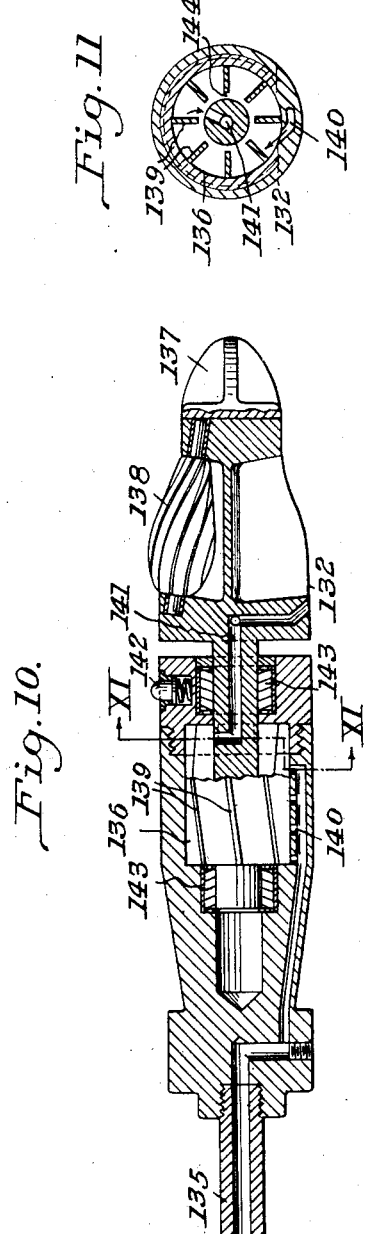
INVENTOR
James V. Caputo
by his attorneys
Byrnes, Stebbins, Parmelee & Blenko Patented Feb. 5, 1935

1,990,370

UNITED STATES PATENT OFFICE 1,990,370

WELDING APPARATUS

James V. Caputo, Girard, Ohio

Application November 14, 1929, Serial No. 407,130

6 Claims. (Cl. 219—6)

My invention relates to an electric welding machine which is designed to receive formed metal lengths, position them in welding relation, effect a weld, and transfer the welded article to a delivery table. Although not limited to such application, the invention will be described as embodied in a pipe-welding machine.

In the past, it has been the practice to manufacture pipe by heating flat skelp in a furnace and drawing it through forming and welding dies, which unite the edges of the skelp to form a length of pipe. This method of welding pipe is costly because it necessitates a large investment in buildings and machinery, and requires many manual operations. The process is comparatively slow, ninety tubes per hour being a record production for one mill of the present type, and this fact adds to the unit cost. The product is not perfect but is characterized by faulty welds which often necessitate a second and even a third heating and passage through the welding dies. The reheating causes the metal to flow forming "liquor marks" and resulting in unequal thickness of the pipe wall at various points in its circumference. These defects make it necessary to scrap a considerable proportion of the output of a tube mill.

It has been suggested to utilize electric current to effect a weld between metal sections. In one such process, spaced individual electrodes are manually actuated into engagement with the sections to be welded at separate points thereon. Current is then supplied to the electrodes and, in traversing the metal sections, heats them to such an extent that the edges thereof are welded. Welds formed by this method are not uniform, and the operation requires a large number of workmen, and, for that reason, it represents but a slight advance over the earlier methods.

Another method of electric welding involves the use of electrode rollers between which an alternating current is passed. The sections to be welded are traversed by the alternating current and a so-called "stitch weld" is formed. It is found that tube manufactured by this method will not sustain high pressures and is not oil tight because of the lack of continuity in the welded joint. This method is useful only in the manufacture of thin-walled tubing.

I have invented a welding machine which includes means for receiving formed metal lengths of any desired cross-section. My invention also embodies means for matching a plurality of sections to be welded and maintaining them in welding relation. Transfer means seize the sections and, maintaining them in proper relation, deliver them to a welding device, wherein they are disposed on a support and clamped by a holding member.

The welding device comprises retractable jaws, which may be actuated into engagement with the sections to be welded. When this engagement has been effected, electric current is passed between the welding jaws and traverses the sections to heat the edges thereof to welding temperature. The application of increased pressure to the welding jaws at this stage of the manufacture completes the weld. Cleaning means for the welded article are provided so that any imperfections formed therein, during the manufacture, can be removed. After the welded article has been cleaned, it is transferred to a delivery table by transfer mechanism, which seizes it from the welding jaws and places it in position for delivery.

For a thorough understanding of the invention, reference is made to the accompanying drawings, illustrating a present preferred embodiment thereof.

In the drawings,

Figure 4 is an enlarged view of one end of the machine, partly broken away, showing portions of the device in section and other portions in elevation;

Figure 5 is a section at the plane of line V—V of Fig. 4;

Figure 6 is a detail view of a portion of the structure shown also in Fig. 4;

Figure 7 is a sectional view at the plane of line VII—VII of Fig. 4;

Figure 8 is a detail view of the means for supporting the metal lengths between the welding jaws;

Figure 1:
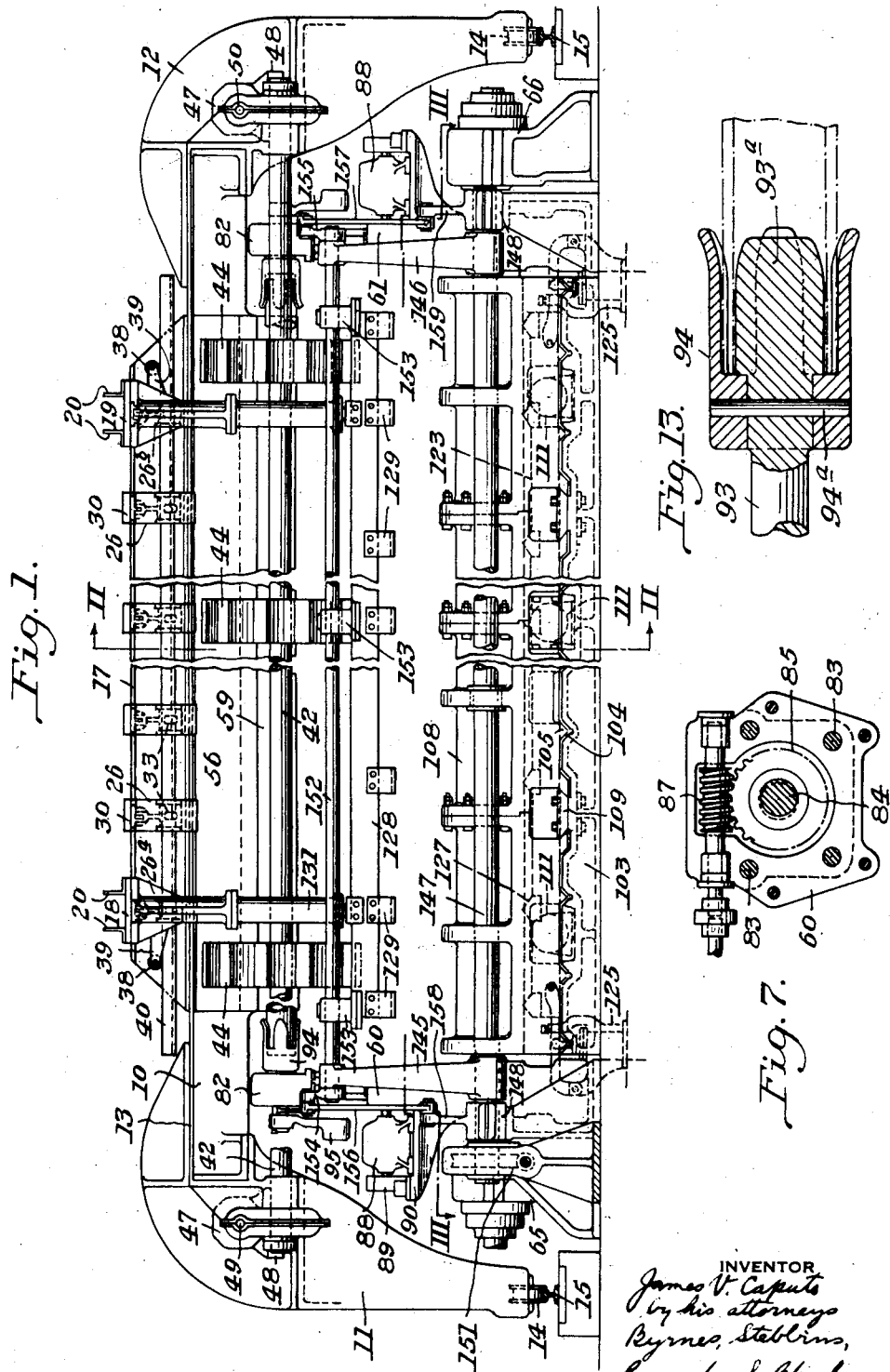
Figure 1 is a side elevation of the welding machine.
Figure 2:
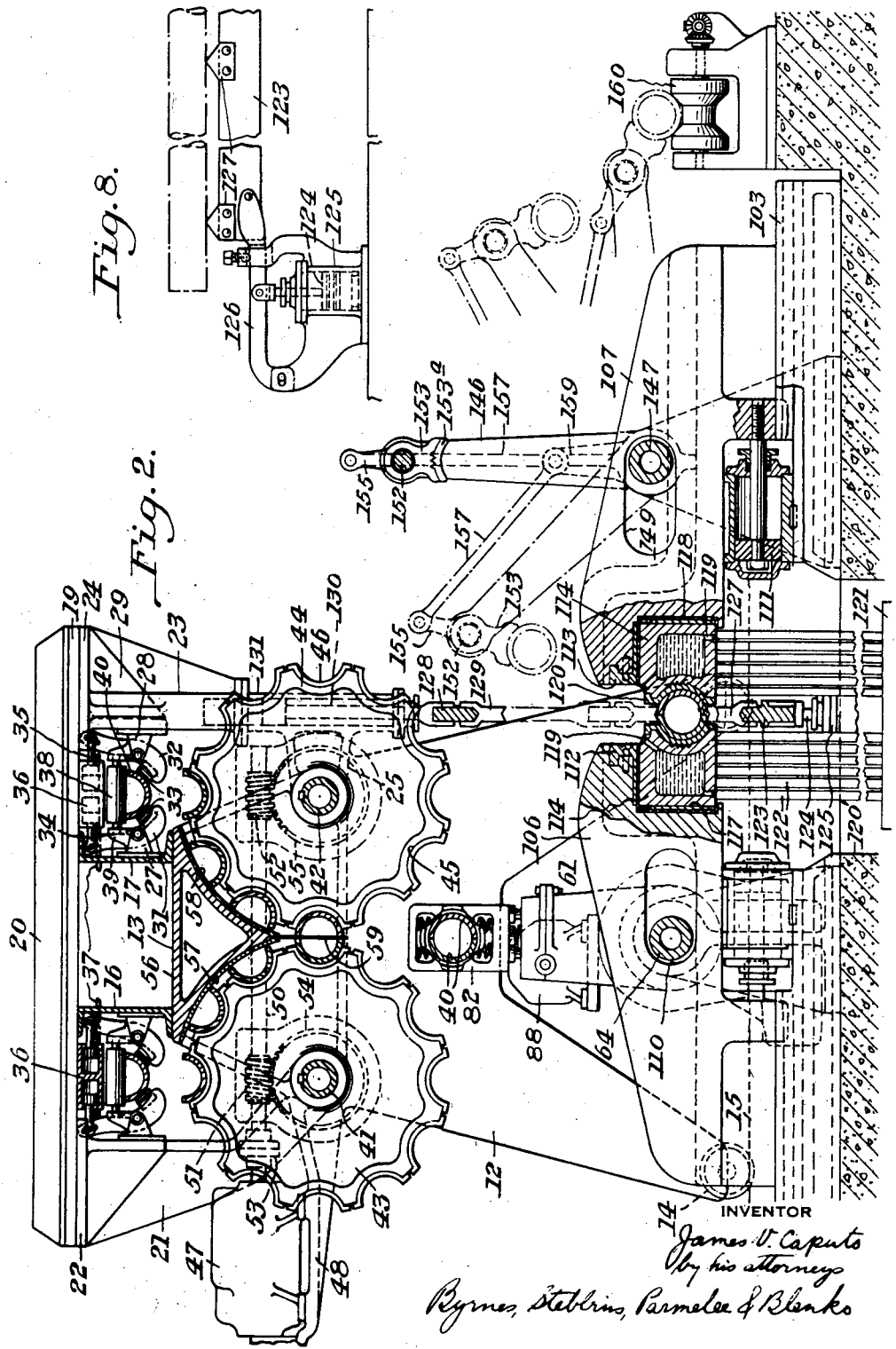
Fig. 2 is a transverse section at the plane indicated by the line II—II of Fig. 1.

Figures 9, 10, and 11 show the construction of the means for cleaning the welded article;

Figure 12 is a detail view of the electrodes and the manner in which they are seated in the welding jaws; and Figure 13 is a longitudinal section of a detail shown in Figs. 1, 2, and 4.

The preferred embodiment illustrated on the drawings is a pipe welding machine, but it is to be understood that the invention is not limited to the manufacture of pipe, since welded metal lengths having a non-circular cross-section may be manufactured by slightly altering certain features of the machine. The illustrated embodiment of the invention is in nowise intended to limit the scope thereof, since any alterations in the structure illustrated may be made, if found desirable, without departing from the spirit of the invention or the scope of the appended claims. In describing the invention, I shall discuss the details of the various portions in the following way: (1) the skelp-receiving and matching means; (2) the transfer arms; (3) the welding machine proper; (4) the cleaning mechanism; (5) the delivery means. After the detailed description, a complete explanation of the operation of the machine will be given.

*Skelp-receiving and matching device*

The illustrated embodiment of the invention is designed to weld lengths of skelp which have been given a semi-circular cross-section by means of any suitable forming apparatus. The skelp may be formed hot or cold and is delivered to the skelp-receiving and matching device directly from the forming means. The skelp-receiving and matching device comprises a bridge 10, made up of end castings 11 and 12, and a longitudinal member 13. The end castings 11 and 12 are provided with wheels 14 by which the entire super-structure of the skelp-receiving and matching device may be shifted along the rails 15. Channels 16 and 17 extend lengthwise of the bridge 10, being supported by the longitudinal casting 13. Transverse beams 18 and 19 overlie the channels 16 and 17. Angle irons 20 are riveted to the transverse beams to increase the rigidity thereof.

Bearing brackets 21, having foot portions 22, are secured to the ends of the beams 18 and 19, which overhang the channel 16. Posts 23, having foot portions 24, are secured to the ends of the beams 18 and 19, which overhang the channel 17. The posts 23 provide a support for bearing brackets 25.

Skelp-supporting rolls 26 are provided at intervals along the length of the channels 16 and 17. The skelp-supporting rolls 26 may best be observed in Fig. 2 and consist of bearing brackets 27 and 28; the bearing bracket 27 being secured to the channel 17, and the bracket 28 being supported on an angle bracket 29, which is secured to the overhanging end of an intermediate transverse beam 30.

Retractable arms 31 and 32 are pivotally mounted in the bearing supports 27 and 28. Each of the arms 31 and 32 is provided with a skelp-engaging roller 33. Fluid operated pistons 34 and 35 are provided for actuating the arms 31 and 32. The pistons 34 and 35 slide in a double-ended cylinder 36, and fluid-supply pipes 37 extend to a source of fluid under pressure suitably controlled by which the operation of the skelp-supporting rolls may be governed.

The skelp-supporting rolls 26a and 26b at the ends of the channels 16 and 17 include skelp-positioning rollers 38. The rollers 38 are journaled in projections 39, which extend upwardly from the bearing brackets 27 and 28. A length of skelp 40 is shown in the position in which it is maintained by the engaging rolls 33 and the positioning roll 38. In order to render the insertion of the formed skelp into the receiving rolls more easy, it may be desirable to provide guide plates (not shown) between adjacent skelp-receiving rolls 26. These plates should have a contour similar to that of the skelp and should extend from a point adjacent one set of supporting rolls to a point adjacent the next set.

A pair of shafts 41 and 42 are journaled in the bearing brackets 21 and 25, respectively. Skelp matching wheels 43 and 44 are keyed to the shafts 41 and 42. The wheels 43 and 44 have recesses 45 formed in their circumference for receiving one of the metal lengths to be welded. In the present embodiment, since the invention is arranged for welding pipe, the recesses 45 in the circumference of the wheels 43 and 44 are of semi-circular shape. Removal shoes 46 are secured in the recesses 45. These shoes may be renewed when worn or replaced when a different size of pipe is to be made.

The shaft 41 is driven in a clockwise direction, and the shaft 42 in the reverse direction by means of motors 47 mounted on shelves 48 formed on the end castings 11 and 12. Transverse worm shafts 49 and 50 are journaled in the end castings 11 and 12 and are provided with worms 51 and 52, which have their threads cut in opposite directions. The shafts 49 and 50 are connected to the motors 47 and 48 by means of a suitable coupling 53. Worm wheels 54 and 55 are keyed to the shafts 41 and 42 and are engaged by the worms 51 and 52. When the motors 47 are simultaneously energized, the wheels 43 and 44 rotate in opposite directions. If desired, one of the driving motors 47 may be dispensed with and a single motor relied on to drive the shafts 41 and 42 in opposite directions.

The central portion 56 of the bridge casting 13 has a substantially V-shaped cross section. Wearing plates 57 and 58 are secured to the outer surfaces of this portion of the bridge casting, and a guide plate 59 is secured therebetween.

*The transfer device*

Figure 3:
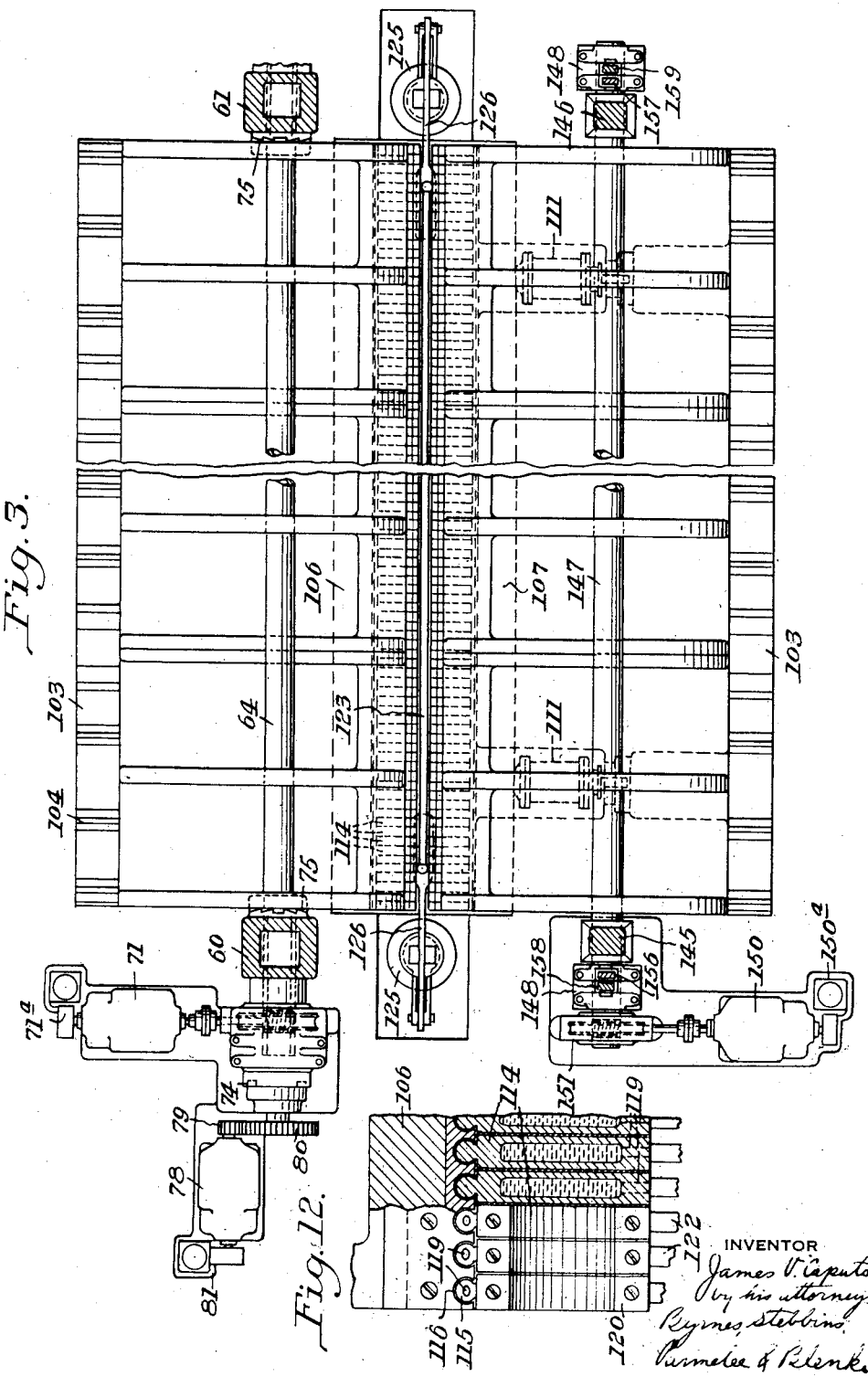
Figure 3 is a plan view of a portion of the machine, parts thereof being shown in section at the plane of the line III—III of Fig. 1.

The mechanism for transferring matched skelp from the skelp-receiving device to the welding machine is best illustrated in Figs. 1 to 4. This device comprises a pair of transfer arms 60 and 61. The arm 60 is shown in section in Fig. 4 and includes a hub 62, elongated to a non-circular cross-section, and a counter-weight 63. The hub 62 is threaded internally and cooperates with a threaded portion of a shaft 64. Bearings 65 and 66 for the shaft 64 include the bearing housing 67 and a bushing 68 rotatable therein. Fig. 5 illustrates the details of this structure. A worm wheel 69 is formed on the bushing 68 and is adapted to be engaged by a worm 70 journaled in the bearing housing 65. The worm 70 is directly connected to the shaft of a motor 71, having an electromagnetic brake 71a, as shown in Fig. 3.

Clutch teeth 72 and 73 are formed on the ends of the hub 62 of the arm 60 for cooperation with corresponding teeth 74 and 75 formed on collars 76 and 77 which are keyed to the shaft 64. The hub 62, instead of being non-circular, may be splined within the bushing 68, having movement longitudinally thereof without being rotatable therein.

The shaft 64 is driven by a motor 78 through a pinion 79 on the shaft thereof, and a gear 80 keyed to the shaft 64. An electromagnetic brake 81 is provided for the motor 78.

The upper end of the arm 60 carries a head 82 on posts 83 slidable in the arm 60. The head 82 is provided with a screw 84. A worm wheel 85 is journaled within the arm 60 and is keyed to an internally-threaded sleeve 86, rotatably mounted in the end of the arm 60 for receiving the screw 84. The worm wheel 85 is driven by a worm 87 journaled in the arm 60. A motor 88, having an electromagnetic brake 89 is supported on a shelf 90 integral with the arm 60 for driving the worm 87.

Fig. 6 illustrates the details of the head 82, which include a slidable-bearing block 91, which is resiliently mounted within the head on springs 92. A stub shaft 93 is journaled within the bearing block 91 and is provided with a bell 94. A counter-weight 95 is keyed to the shaft 93. The bearing for the shaft 93 has a projecting hub 96 provided with recesses 97 at the ninety degree points of the circumference of the hub. A pair of arms 98 and 99 is provided with terminals 100 for entering the recesses 97. The arms 98 and 99 are pivoted at 101 to the head 82 and are maintained in engagement with the hub 96 by means of a spring 102.

Fig. 13 shows the construction of the bell gripper 94. This is an important feature of the invention and includes, beside the bell proper 94, a mandrel 93a therein, integral with the stub shaft 93. The bell 94 is secured to the shaft 93 by a pin 94a or equivalent means such as a set screw. By means of the bell 94 and the mandrel 93a, the matched skelp is firmly held in welding relation, both internally and externally. The expanded mouth of the bell and the tapered end of the mandrel permit the skelp to be properly gripped regardless of slight abnormalities in the shape thereof or inaccurate positioning of the transfer arms.

The welding device

The welding device and its associated elements are illustrated in Figs. 1 to 3, 8 and 12. The device includes a plurality of base castings 103. The castings 103 are provided with grooves 104 for receiving projections 105 on the lower face of the welding jaws 106 and 107, which are slidably mounted on the base castings 103. The welding jaws 106 and 107 are made up of a plurality of ribbed castings 108, which are bolted together and secured to the base castings by locking plates 109 bolted thereto. The ribs of the castings comprising the jaw 106 are provided with openings 110 for receiving the shaft 64 of the transfer mechanism described above.

A plurality of fluid-operated pistons 111 are provided for operating the sliding jaws 106 and 107. The faces of the jaws 106 and 107 are machined to receive jaw plates 112 and 113. Electrodes 114 are supported from the jaw plates 112 and 113 by means of heads 115 integral with the electrodes which are received in slots 116 in the jaw plates. A manganese wearing plate 117, preferably of non-magnetic metal which is hard and durable, forms a backing for the electrodes and the entire electrode-structure is insulated from the jaws and jaw plates by means of the insulation 118. The electrodes are similarly insulated from each other, as shown in Fig. 12. The electrodes are not solid, but are cored out for the reception of cooling fluid, connections therefor being shown at 119. The electrodes 114 are provided with removable shoes 120, which are screwed to the faces of the electrodes.

Below the welding jaws 106 and 107, a transformer pit 120' is provided. A transformer 121 therein is connected to the electrodes 119 by means of flexible leads 122 which are welded to the electrodes.

A lower guide support 123 is mounted below the welding jaws and is adapted to be raised and lowered by fluid-operated pistons 124. The pistons 124 reciprocate in cylinders 125 in the transformer pit. Levers 126 secured to the guide support 123 are engaged by the piston 124 to elevate or depress the former. V-shaped jaws 127, with knife-edge surfaces to prevent the accumulation of scale thereon, are secured to the support 123 for engaging the matched skelp as it is delivered to the welding machine.

An upper guide 128 is provided with pipe-engaging projections 129. The upper guide 128 is operated by means of pistons 130, which reciprocate in cylinders 131 secured to the posts 23. The operative position of the guide support 123 and the guide 129 are indicated in dotted lines in Fig. 2.

The cleaning device

I provide cleaning means for the welded pipe which are designed to effect the cleaning operation while the pipe is held in the welding jaws. The cleaning device is illustrated in Figs. 9, 10 and 11 and comprises a reamer 132 which is actuated by a piston 133. The piston 133 slides in a cylinder 134 and is driven by air pressure. A piston rod 135 connects the piston 133 and the reamer 132 and is bored out to serve as a conduit for supplying air to an air motor 136 in the reamer 132.

The reamer 132 is provided with a plow 137 having rotary cutters 138. The plow and cutters are rotatably mounted in the body of the reamer and a plurality of fan blades 139 are secured thereto. An air blasting impinges on the blades 139 from the ports 140 which are connected to the conduit in the piston rod 135. Air is exhausted from the motor 136 through a conduit 141 in the shaft of the motor which directs the exhaust blast ahead of the cleaner. The exhaust air thus serves to blow any foreign matter which may collect ahead of the reamer out of the pipe. The body of the reamer is supported in the pipe on a plurality of spring-pressed studs 142. Suitable bearings 143 are provided for the shaft of the air motor 136. The fan blades 139 are cut away as indicated at 144 in Fig. 11 to permit air to flow from the space between any two blades to the exhaust conduit 141.

The delivery arms

The means which are provided for removing welded pipe from the welding device includes a pair of transfer arms 145 and 146. The arms 145 and 146 are keyed to a shaft 147 which is journaled in suitable bearings 148. The ribs of the welding jaw 107 are provided with openings 149 to receive the shaft 147. The arms 145 and 146 and the shaft 147 are arranged to be rotated by a motor 150 having an electromagnetic brake 150a (see Fig. 3). The shaft of the motor 150 is connected to the shaft 147 through a worm and worm wheel indicated generally at 151.

The outer ends of the arms 145 and 146 serve as journal bearings for a shaft 152. A plurality of electromagnets 153, having renewable shoes 153a, are secured to the shaft 152. Cranks 154 and 155 are keyed to the shaft 152. Links 156 and 157 connect the cranks 154 and 155 to fixed fulcrums 158 and 159 which are integral with the bearings 148.

A set of delivery rolls 160 are located adjacent the arms 146 and 147 to receive the skelp delivered thereby and pass it to a cooling table.

Method of operation

Having described the structure by which I accomplish the objects of the invention, a general description of the method of operation will be entered into. In describing the operation of the invention, all reference to the means for controlling the various devices will be omitted. It is to be understood, of course, that the various elements of the invention may be manually or automatically controlled. I prefer to employ an automatic-electric control system by which the operations can be effected speedily in proper sequence without supervision. The details of the control system are subject to wide variations, and it will suffice to say that any control means may be used to operate the machine depending upon the requirements of a particular installation.

The first step in the process is the delivery of formed skelp from the forming devices to the skelp-supporting rolls 26a and 26b. The rollers 33 of these devices occupy the position shown in Fig. 2 and the formed skelp is inserted at one end of the machine and is supported by the several sets of rolls. The skelp-positioning rollers 38 maintain the skelp, so that its edges lie in a horizontal plane. Lengths of skelp are fed simultaneously to both sets of skelp-receiving rolls, which support the skelp in position above corresponding recesses in the matching wheels 43 and 44.

When both lengths of skelp have been inserted in the skelp-receiving rolls and an empty recess in the wheels 43 and 44 is disposed below the skelp lengths, fluid pressure is admitted to the cylinder 36 to retract the pistons 34 and 35. The skelp-supporting rolls 33 are thus withdrawn from beneath the skelp length by the movement of the arms 31 and 32. In order to maintain the skelp in proper position while it is being released from the rolls, I withdraw the various rolls in succession beginning at one end. By this method of procedure, one end of the skelp is lowered into its recess in the matching wheel, while the other end is still engaged by the positioning roll 38. When all but the last set of rolls have been withdrawn, one end of the skelp will lie upon its recess in the matching wheel. When the last set of rolls is withdrawn, the other end of the skelp falls into its notch in the matching wheels with its edges in a horizontal plane.

The motor 47, which drives the matching wheels 43 and 44, is adapted to be intermittently energized to advance the wheels in steps. After skelp lengths have been placed in the uppermost recesses of the matching wheels, the shafts 41 and 42 are rotated so that an empty recess is positioned beneath the skelp-receiving rolls. The rolls are then restored to their original position, additional skelp is supplied thereto, and the foregoing operation is repeated to p'ace another set of skelp lengths in the matching wheels. The wheels are then rotated to bring another set of empty recesses beneath the skelp-receiving rolls.

As the matching wheels 43 and 44 rotate, the corresponding lengths of skelp on the two wheels are gradually brought together with their edges in juxtaposition. The V-shaped central portion 56 of the bridge casting 13 acts as a guide to prevent the skelp from sliding out of the recesses in the matching wheels. The guide plate 59 also serves in a similar capacity. When the skelp reaches a position in alinement with the shafts 41 and 42, it will be in proper relation for welding along diametrically opposite lines to form a continuous length of pipe.

Under these conditions, the transfer arms 60 and 61 are retracted so that the clutch teeth 72 of the hub 62 of the arms engage the clutch teeth 74 on the collars 76 keyed to the shaft 64. The arms, furthermore, are in the vertical position, as shown in Fig. 2. The motors 88 are energized to raise the heads 82 of the arms 60 and 61 to a position in alinement with the matched skelp, as shown in Fig. 1.

When the heads of the arms 60 and 61 have been alined with the matched skelp, the motor 78 is energized to turn the shaft 64 in such direction that the arms 60 and 61 will move axially thereof toward the matched skelp. The arms 60 and 61 are prevented from rotating by the fact that the bushing 68 is locked by the worm 70 and that the hub 62 is non-rotatable in the bushing 68 because of its non-circular cross-section or equivalent spline connection with the bushing. As the arms 60 and 61 approach their innermost position, the bells 94 thereon engage the matched skelp externally and internally and maintain the sections thereof in the relation brought about by the operation of the matching wheels. When the arms 60 and 61 reach the extreme inner limit of their movement, the clutch teeth 73 and 75 are engaged and the motor 78 is deenergized. The spring mounting of the shaft 93, which carries the bell 94, permits the bell to engage the matched skelp, regardless of any slight inaccuracy in the positioning of the arms or in the matching of the skelp.

When the bells 94 have gripped the matched ske'p, the motors 88 are reversed to restore the heads 82 to their normal position with respect to the arms 60 and 61. This reverse movement of the heads 82 lowers the matched skelp and removes it from the matching wheels as the rotation of the latter continues.

When the heads 82 are lowered, the arms 60 and 61 have been moved inwardly so that the clutch 73, 75 is engaged. The brakes 81 and 71a are released and the motor 71 is then energized to turn the worm 70. Movement of the worm wheel 69 is thus effected and the arm 60 is rotated thereby. Since the clutch 73, 75 is engaged, the shaft 64 is also rotated and the movement of the arm 60 is thus communicated to the arm 61 which has its corresponding clutch in engagement. By this means, the motor 71 operates both the transfer arms 60 and 61 through the same angular distance through the worm wheel 69.

As the arms 60 and 61 rotate from the vertical to the horizontal position, the counter-weights 95, keyed to the stub shafts 93 carrying the bell 94, swing in a ninety degree arc, and, when the arms 60 and 61 reach the horizontal position the matched skelp is shifted so that the plane of the edges thereof is maintained vertical. The arms 98 and 99, which are pivoted on the heads 82, tend to prevent oscillation of the shafts 93 and to maintain the skelp in proper position by the engagement of the cylindrical end portions 100 thereof with the notches 97 in the hub of the bearing for the shaft 93.

The lower guide support 123 has, by this time, been raised by the admission of fluid under pressure to the cylinders 125, so that the members 127 thereon engage the matched skelp at its lower edges. The upper guide clamp 128 is then lowered so that the members 129 engage the upper edges of the skelp.

When the lower guide support 123 and the upper guide clamp 128 have engaged the matched skelp, a reverse rotation is given to the shaft 64 so that the arms 60 and 61 are retracted and the bells 94 release their hold on the skelp. At the extreme outer limit of the axial movement of the arms 60 and 61, the clutch teeth 72 and 74 become engaged so that the arms 60 and 61 are again rigidly locked to the shaft 64. At this time, the brakes 81 and 71a are again released and the motor 71 is reversed to drive the worm 70 and the worm wheel 69 in such direction as to restore the arms 60 and 61 to the vertical position. When the arms have reached this position, the motor 71 is deenergized and its brake 71a becomes effective to lock the arms in that position.

The matched skelp is now positioned in welding relation between the welding jaws 106 and 107, which are in their retracted position. The skelp is supported between the lower guide support 123 and the upper guide clamp 128 which have taken the dotted positions shown in Fig. 2. The matched skelp being ready for welding, the jaws 106 and 107 are advanced into engagement therewith by the admission of fluid under pressure to the cylinders 111. As the jaws 106 and 107 advance to the welding position, the electrode shoes 120 engage the matched skelp. When this engagement has been effected, the lower guide support 123 and the upper guide clamp 128 are withdrawn, and the skelp is supported solely by the clamping action of the welding jaws.

Welding current is supplied to the electrodes from the transformer 121 through the leads 122 welded to the electrodes 114. The leads are sufficiently flexible to permit the limited movement of the welding jaws to and from the welding position. The current traversing the electrodes also passes through the matched skelp and divides substantially equally in two paths, each path including half of each skelp section and one of the seams between sections. Because the contact resistance at the seams is greater than the resistance of the path in the formed skelp, the edges of the skelp adjacent the seams are heated to a greater extent than the other portions of the skelp. Unnecessary heating of the entire section of skelp is thus avoided, and the heat is concentrated along the lines of weld.

When the temperature of the edges of the skelp has been raised to the welding point, additional welding pressure is applied to the jaws 106 and 107 through the cylinders 111. The skelp sections are thus firmly welded together into a continuous length of cylindrical pipe.

While the welded pipe is maintained in the welding jaws, the cleaning device 132 is driven therethrough to remove any imperfections of the interior of the pipe and to ream the latter to the proper internal diameter. Any blisters, convexities or flash formed on the inside of the pipe is thus removed, and a perfect cylindrical shape is imparted to the latter.

After the welded pipe has been cleaned, the lower guide support 123 is again brought into engagement therewith. The welding jaws 106 and 107 are withdrawn to permit the removal of the pipe which is effected by the delivery arms 145 and 146. When the welding jaws have been retracted, the motor 150 is energized, its brake 150a having been released, to rotate the arms counter-clockwise through the worm and worm wheel 151. As the arms 145 and 146 are rotated, the link 157 and the crank 155 turn the shaft 152 so that the electromagnets 153 are disposed in position to engage the welded pipe. When this engagement has been effected, the electromagnets are energized and the movement of the arms is reversed to transfer pipe to the delivery rolls 160. When the pipe has been placed on the rolls, the electromagnets are deenergized and the arms restored to their normal position. The arrangement of the electromagnets on the shaft 152 and the means for turning the shaft as the arms rotate permits the pipe to be removed from the welding jaws with great facility. The pipe length is swung, as it were, between the arms 145 and 146. The electromagnets seize the pipe from above, and its removal is effected with dispatch. From the delivery rolls 160, the pipe may be transferred to a cooling table and a threading bay.

The invention represents a marked advance in the manufacture of pipe by electric welding. It includes means for receiving formed skelp and positioning the latter with accuracy. The matching wheels serve to bring the positioned skelp into welding relation. The transfer arms seize the matched skelp and transfer it quickly to the welding position. In the welding position, skelp is supported by the upper and lower guides, and the transfer arms withdrawn. The welding jaws are then advanced, the welds completed and the jaws retracted to permit the removal of the finished article after it has been properly cleaned and reamed.

Efficient operation can be effected very rapidly, and the control can be made full automatic, semi-automatic or manual as desired.

Although I have illustrated and described herein a present preferred embodiment of the invention, it is to be understood that many of the details disclosed may be changed as required. Other means than those shown for actuating the various members of the machine may be employed. For this purpose, I consider electric motors, electromagnets, and fluid-operating pistons full equivalents. Mechanical equivalents for the various driving connections between the operating means and the driven devices may likewise be used. All such changes, however, are intended to be included within the spirit of the invention as defined by the appended claims, and the invention may be practiced in any such form without departing from the scope thereof.

I claim:

1. A welder for joining shaped metallic sections comprising a bedplate, retractible welding jaws slidably mounted on said bedplate, means for advancing and retracting said jaws, vertically retractible means between said jaws for receiving matched metal lengths and supporting them, a vertically shiftable clamp between said jaws for descending upon said sections and engaging them to hold them in welding position, means for positioning matched lengths between said support and clamp, said welding jaws having individual electrodes spaced therealong, welding shoes carried by said electrodes for engaging said sections, and power transformers positioned below the welder for supplying energy to said electrodes.

2. Apparatus for welding shaped metal lengths comprising a bedplate, welding jaws slidable laterally on said bedplate, said welding jaws being provided with individual electrodes, and current supply means below the welder connected to said electrodes, a vertically movable support between said jaws for receiving and supporting matched metal lengths therebetween, and a vertically movable clamp above said support for engaging the upper portions of sections to be welded.

3. Apparatus for welding shaped metal lengths comprising a pair of laterally slidable welding jaws for engaging said lengths, electrodes on said jaws, current supply means connected to said electrodes, means for supplying matched lengths to said welder, and means for supporting and clamping said lengths in welding position between said jaws.

4. A device for welding shaped metal lengths comprising slidable welding jaws having electrodes for engaging said sections, current supply means connected to said electrodes, means between said jaws for supporting matched lengths in position to be engaged by said welder on the closing of said jaws, and means for removing welded pipe from said jaws.

5. A welding apparatus for joining shaped metal sections comprising opposed jaws movable toward and away from each other, electrodes distributed along said jaws, means between the jaws for supporting and clamping matched sections in welding position, and means for delivering matched sections thereto.

6. A welding apparatus comprising welding jaws for engaging and supplying current to matched metal sections, a bottom support for said sections between said jaws, means for delivering matched sections thereto, an upper clamping member for engaging matched sections and means for lowering it onto said sections.

JAMES V. CAPUTO.